United States Patent [19]
Martin et al.

[11] Patent Number: 6,026,835
[45] Date of Patent: Feb. 22, 2000

[54] HIGH CV BULK PROCESS VALVE, CONTROL SYSTEM AND METHOD

[75] Inventors: Richard L. Martin, Southbury, Conn.; Harry Clay Nesbitt, Benicia, Calif.; David Edward Dwelly, Antioch, Calif.; John F. Schoeppel, San Rafael, Calif.

[73] Assignee: Veriflo Corporation, Richmond, Calif.

[21] Appl. No.: 09/102,625

[22] Filed: Jun. 23, 1998

[51] Int. Cl.[7] .................................. F16K 31/126
[52] U.S. Cl. .................. 137/1; 137/205; 251/118; 251/61.5
[58] Field of Search .................. 251/61.1, 61.2, 251/61.5, 118, 123; 137/1, 205

[56] References Cited

U.S. PATENT DOCUMENTS

| | | |
|---|---|---|
| D. 348,096 | 6/1994 | Greenwood et al. . |
| 5,082,238 | 1/1992 | Grooms et al. ......................... 251/61.5 |
| 5,385,334 | 1/1995 | Greenwood et al. . |
| 5,482,254 | 1/1996 | Greenwood et al. . |
| 5,575,454 | 11/1996 | Ushitora et al. ........................ 251/61.5 |

*Primary Examiner*—Kevin Lee
*Attorney, Agent, or Firm*—Antonelli, Terry, Stout & Kraus, LLP

[57] ABSTRACT

A high Cv bulk process valve, control system and method convey a process gas or liquid for manufacturing semiconductors through a fluid passage. The fluid passage contains an aerodynamically shaped expansion chamber within which a valve seat and a moveable poppet are arranged for opening and closing the fluid passage. The aerodynamically shaped expansion chamber includes a conically expanding entry and a conically contracting exit and is shaped such that the resistance to flow of the process gas or liquid through the fluid passage of the valve is very nearly the same as through a straight tubing having a cross-sectional area of an inlet to the valve and a length of the fluid passage through the valve. The valve can be added or subtracted from a gas or liquid control system with virtually no changes in pressure drop of flow restriction, when the valve is in the open position. The valve minimizes the energy consumed by valves in semiconductor gas systems.

23 Claims, 5 Drawing Sheets

HIGH CV BULK PROCESS VALVE, CONTROL SYSTEM AND METHOD

FIELD OF THE INVENTION

The present invention relates to an improved bulk process valve for controlling the flow of a gas or liquid, a gas or liquid control system utilizing the valve, and to a related method of minimizing the energy consumed by a valve in a gas or liquid control system. The invention is particularly adapted to control systems for supplying semiconductor processing gases and liquids to semiconductor processing apparatus.

BACKGROUND OF THE INVENTION

Gas and liquid control systems are used in the semiconductor industry to supply process gases and liquids to semiconductor processing equipment. These systems typically comprise highly finished tubing extending between a supply of the process liquid or gas and the semiconductor processing equipment. The process liquids and gases are forced under pressure through the tubing, which necessarily exhibits a certain resistance to the flow therethrough, which resistance is a function of the cross-sectional area and length of the flow passage through the tubing, the internal finish thereof, etc. Valves are provided in these control systems for opening and closing the fluid passages therethrough and thereby controlling the flow of fluid from the supply to the semiconductor processing equipment.

A drawback or limitation of conventional valves used in these control systems is that, even in the open position of the valves, they provide an increased resistance to flow as compared with a piece of straight tubing or pipe of the same inner diameter as the inlet and outlet to the valve and the same length as the fluid passage through the valve. Cv is defined in the ANSI/ISA Control Valve Capacity Test Procedure as a measured number that is inversely proportional to the square root of the resistance to a given flow through a valve, regulator, tubing or similar device. For example, a ten inch long, 316L stainless steel or Hastelloy® C22™ tubing, having a one inch diameter, O.D., and an internal diameter, I.D., of 0.875 inch, whose internal surface is finely finished, $\leq 10$ Ra micro inch, has a Cv of about 42. In contrast, with conventional bulk process valves of the same length, for example, for use with such tubing, the valves having this same internal diameter at their inlet and outlet as the tubing, the valves exhibit lower Cv's, 28–38 that is the Cv's of conventional bulk process valves are substantially lower, e.g., from about 10 to 33% lower than the Cv's of such tubing. Thus, the addition or substraction of a conventional valve to the tubing of a gas or liquid control system causes a change in pressure drop or flow restriction thereof. In the case of addition of a conventional valve, the pressures required to force the process gas or liquid through the control system, even with the valve open, is increased. There is a need for an improved, high Cv bulk process valve, control system and method which overcome this drawback or limitation of the conventional bulk process valves, control systems and methods such that the Cv of the bulk process valve is not substantially lower than the Cv of the tubing.

SUMMARY OF THE INVENTION

An object of the present invention is to provide an improved, high Cv bulk process valve, control system and method which overcomes the aforementioned disadvantage of conventional bulk process valves, control systems and methods. More specifically, an object of the present invention is to provide an improved, high Cv bulk process valve which can be added to or subtracted from the tubing of a gas or liquid control system with virtually no change in pressure drop or flow restriction of the system when the valve is in the open position. A further object of the invention is to provide an improved high Cv bulk process valve, control system and method which reduce the energy consumed by valves in semiconductor or other process gas/liquid control systems.

These and other objects are attained by the improved, high Cv valve of the invention which, according to a disclosed embodiment, comprises a valve body having an inlet for the flow of fluid to the valve, an outlet for the flow of fluid from the valve, a fluid passage extending through the valve body between the inlet and outlet, a valve seat provided in the fluid passage, a poppet moveable to and from the valve seat for closing and opening the fluid passage, and a mechanism for moving the poppet between a valve closed position where the poppet sealingly contacts a valve seat to close the fluid passage and a valve open position for opening the fluid passage and allowing the flow of fluid through the fluid passage in the valve. The fluid passage of the valve includes an expansion chamber containing the valve seat. The expansion chamber has a cross-sectional area larger than that of the inlet and outlet of the valve and is aerodynamically shaped in the direction of flow through the fluid passage such that, when the valve is in the open position, the resistance to flow of fluid through the valve is very nearly the same as through a straight tubing having a cross-sectional area of the inlet of the valve and a length of the fluid passage through the valve.

In the disclosed, preferred embodiment of the invention, the aerodynamically shaped expansion chamber of the high Cv valve includes a conically expanding entry. The conical entry angle of the conically expanding entry in this embodiment is preferably from 6 to 14°, total included angle. The aerodynamically shaped expansion chamber also includes a conically contracting exit which, in the illustrated embodiment, has a conical exit angle which is smaller than the conical entry angle of the conically expanding entry. More particularly, the conical exit angle of the conically contracting exit is preferably from 4 to 8°, total included angle. The axial length of each of the conically expanding entry and the conically contracting exit is selected to be at least 1.5 times the inside diameter of the inlet of the valve. By way of the conically expanding entry, the cross-sectional area of the expansion chamber increases 15–35% from the cross-sectional area of the inlet of the valve. In the disclosed embodiment, the inner diameter of the inlet and that of the outlet are the same.

The high Cv of the valve is also attained in part by the poppet of the valve being formed with an aerodynamic shape such that, when the valve is in the open position, the resistance to flow of fluid through the valve is very nearly the same as through a straight tubing having a cross-sectional area of the valve inlet and a length equal to that of the fluid passage through the valve. The poppet in the disclosed embodiment has a conical shape with a 90°±7° included angle. The valve seat of the valve is arranged in a plane which makes an acute angle to a longitudinal axis of the fluid passage through the valve. The acute angle is 45°±7° in the disclosed embodiment. The mechanism for moving moves the poppet back and forth in a direction orthogonal to the plane of the valve seat for opening and closing the valve.

A gas or liquid control system according to the invention includes a supply of a gas or liquid for processing semiconductors or other products, semiconductor or other processing equipment for making semiconductors or other products, tubing for the flow of the gas or liquid from the supply therethrough to the processing equipment, and at least one high Cv valve according to the invention connected to the tubing between the supply and processing equipment for controlling the flow of the processing gas or liquid in the control system. The diameter of the system tubing connected to the high Cv valve is usually the same or essentially the same as the diameter of the inlet and outlet of the valve.

A method of the invention for minimizing the energy consumed by a valve in a gas or liquid control system comprises conveying gas or liquid through a fluid passage of the control system, and opening and closing the fluid passage with a valve including a valve seat and a moveable poppet arranged in an aerodynamically shaped expansion chamber provided in a section of the fluid passage of the control system such that, when the valve is in the open position the Cv of the valve is very nearly the same as that of a straight tubing having a cross-sectional area of an inlet to the expansion chamber and a length of the expansion chamber.

These and other objects, features and advantages of the present invention will become more apparent from the following detailed description of a disclosed, preferred embodiment of the invention taken with the accompanying drawings.

DETAILED DESCRIPTION OF DISCLOSED EMBODIMENT

Figure 1:
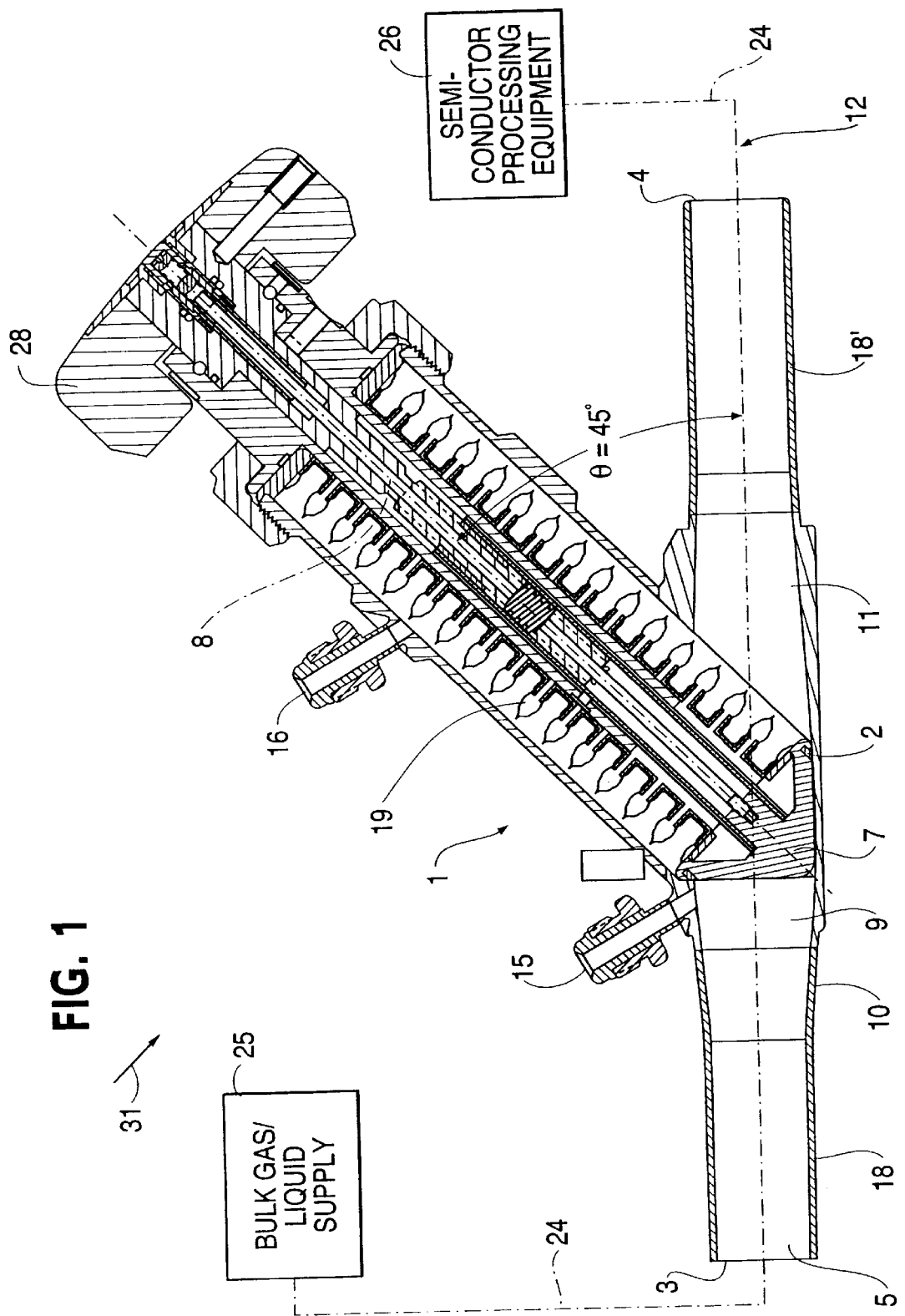
FIG. 1 is a cross-sectional view of a high Cv bulk process valve according to the invention taken along the central longitudinal axis of a flow passage through the valve and the central longitudinal axis of the actuator of the valve, the valve being shown in its closed position and in combination with a schematically illustrated control system for controlling a supply of a gas or liquid from a bulk supply thereof through tubing and the valve to semiconductor processing equipment for making semiconductors.
Figure 3:
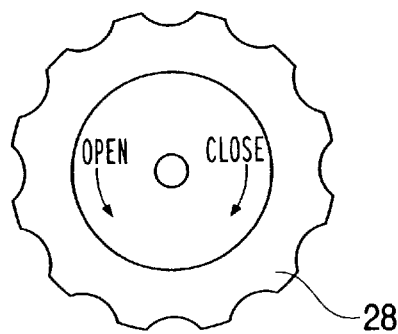
FIG. 3 is a top view of the actuator control knob of the valve as depicted in FIG. 2.
Figure 2:
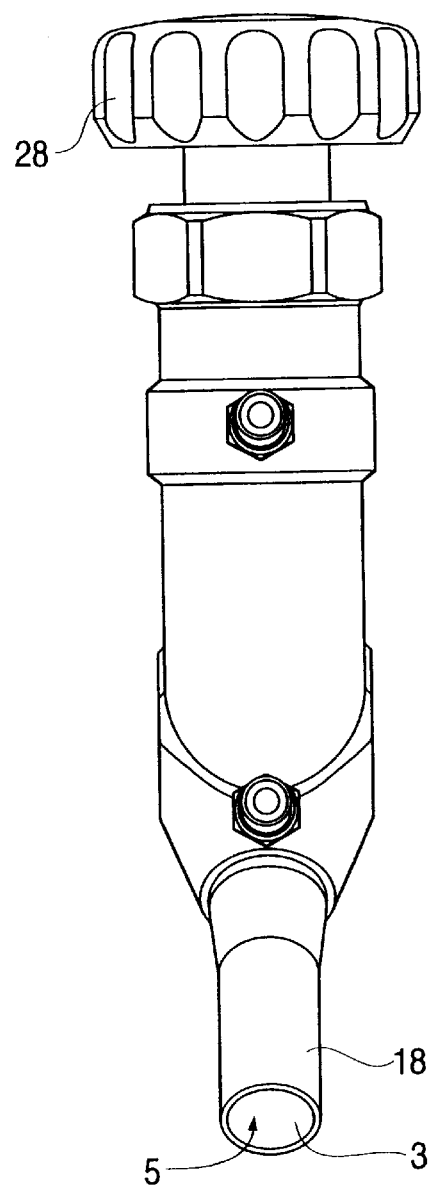
FIG. 2 is an end view of the valve of FIG. 1 taken in the direction of arrow 31 in FIG. 1.
Figure 4:
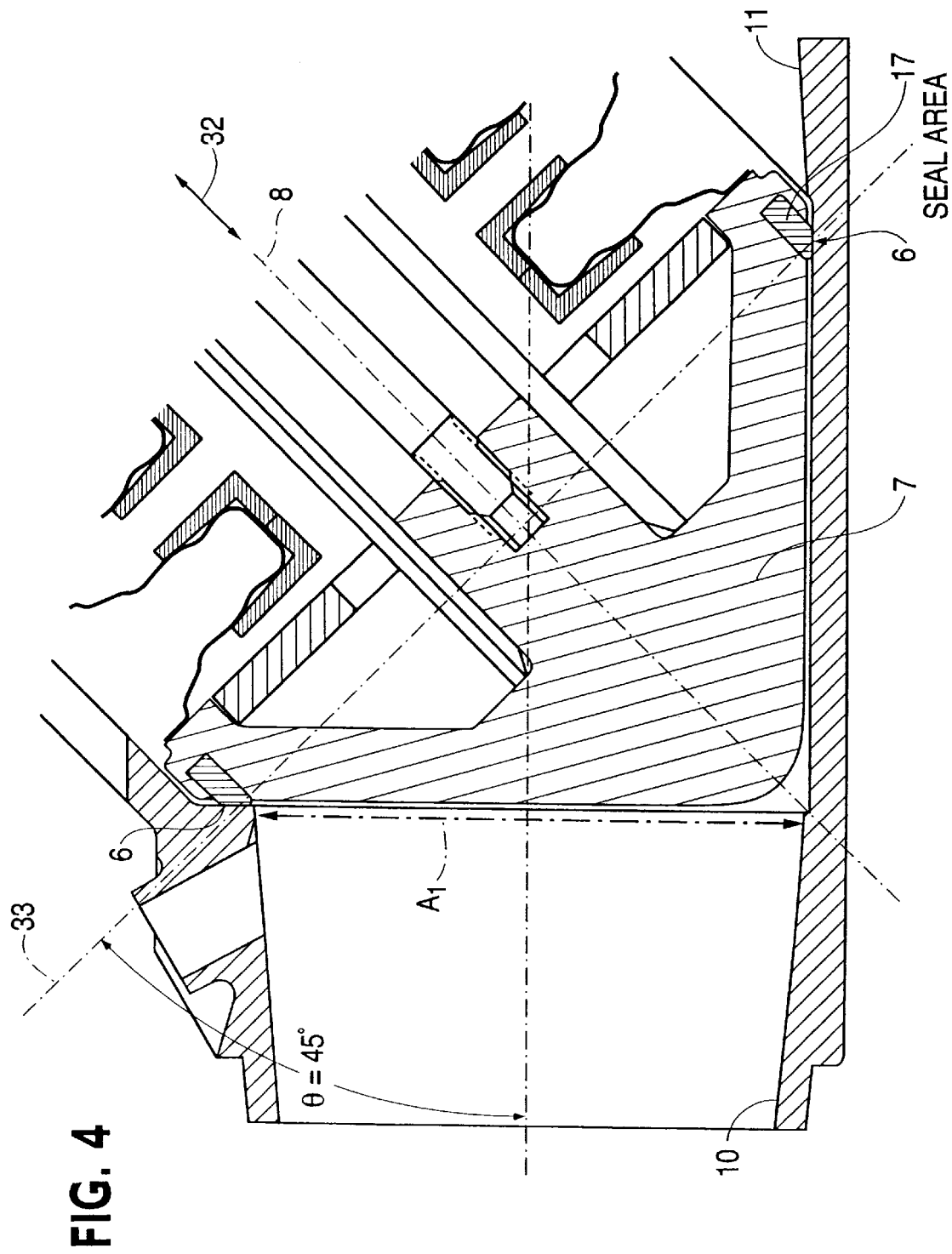
FIG. 4 is an enlarged cross-sectional view of a portion of the valve shown in FIG. 1 illustrating the poppet with seal in sealing arrangement with the valve seat of the valve in the closed position of the valve.

Referring now to the drawings, in FIG. 1 a high Cv valve 1 according to the invention comprises a valve body 2 having an inlet 3 for the flow of fluid to the valve, an outlet 4 for the flow of fluid from the valve, a fluid passage 5 extending through the valve body between the inlet and the outlet, a valve seat 6, FIG. 4, provided in the flow passage, a poppet 7 moveable to and from the valve seat and an actuator mechanism 8 for moving the poppet along the longitudinal central axis of the actuator mechanism 8 for closing and opening the fluid passage. The mechanism 8 moves the poppet between a valve closed position (FIG. 1) where the poppet sealingly contacts the valve seat 6, and a valve open position (FIG. 5) for allowing the flow of fluid through the fluid passage 5 in the valve. The poppet 7 seals against the valve seat 6 by way of a seal 17, FIG. 4, carried by the poppet. The seal 17 is formed of PCTFE, a plastic material, in the disclosed embodiment. As depicted in FIG. 4, the seal 17 is held within an annular groove near the outer edge of the poppet 7 such that the seal 17 projects slightly outwardly from the conical surface of the poppet for contacting the valve seat 6 of the valve body 2 and closing passage 5 in the valve closed position.

The fluid passage 5 through the valve 1 includes an expansion chamber 9 containing the valve seat 6. The expansion chamber has a cross-sectional area ($A_1$ in FIG. 4) larger than that ($A_2$ in FIG. 5) of the inlet 3 of the valve 1. The expansion chamber 9 is aerodynamically shaped in the direction of flow, arrow B in FIG. 5, through the passage 5 of the valve such that, when the valve is in the open position as shown in FIG. 5, the resistance to flow of fluid through the valve 1 is very nearly the same as through a straight tubing having a cross-sectional area of the inlet 3 and the length of the fluid passage 5 through the valve 1.

The aerodynamically shaped expansion chamber 9 of the valve includes a conically expanding entry 10 extending to the immediate vicinity of the valve seat 6. The conical entry angle of the conically expanding entry 10 is preferably within a range of from 6 to 14°, total included angle ($\alpha_1+\alpha_2$ in FIG. 5). In the illustrated embodiment this conical entry angle is 10°.

The aerodynamically shaped expansion chamber 9 further includes a conically contracting exit 11, extending along the passage from the immediate vicinity of the valve seat 6. The conical exit angle of this conically contracting exit is preferably in the range from 4 to 8°, total included angle ($\beta_1+\beta_2$ in FIG. 5). In the illustrated embodiment, this angle is 6°. The conical exit angle of the conically contracting exit 11 in the valve 1 of the invention is also preferably smaller than the conical entry angle of the conically expanding entry 10 for producing the high Cv of the valve. The axial length of each of the conically expanding entry 10 and conically contracting exit 11 is at least 1.5 times the inside diameter ($D_1$) of the inlet 3 of the valve. The cross-sectional area of the expansion chamber 9 increases by way of the conically expanding entry to a cross-sectional area ($A_1$) which is preferably 15–35% greater than the cross-sectional area ($A_2$) of the inlet 3 of the valve.

Figure 5:
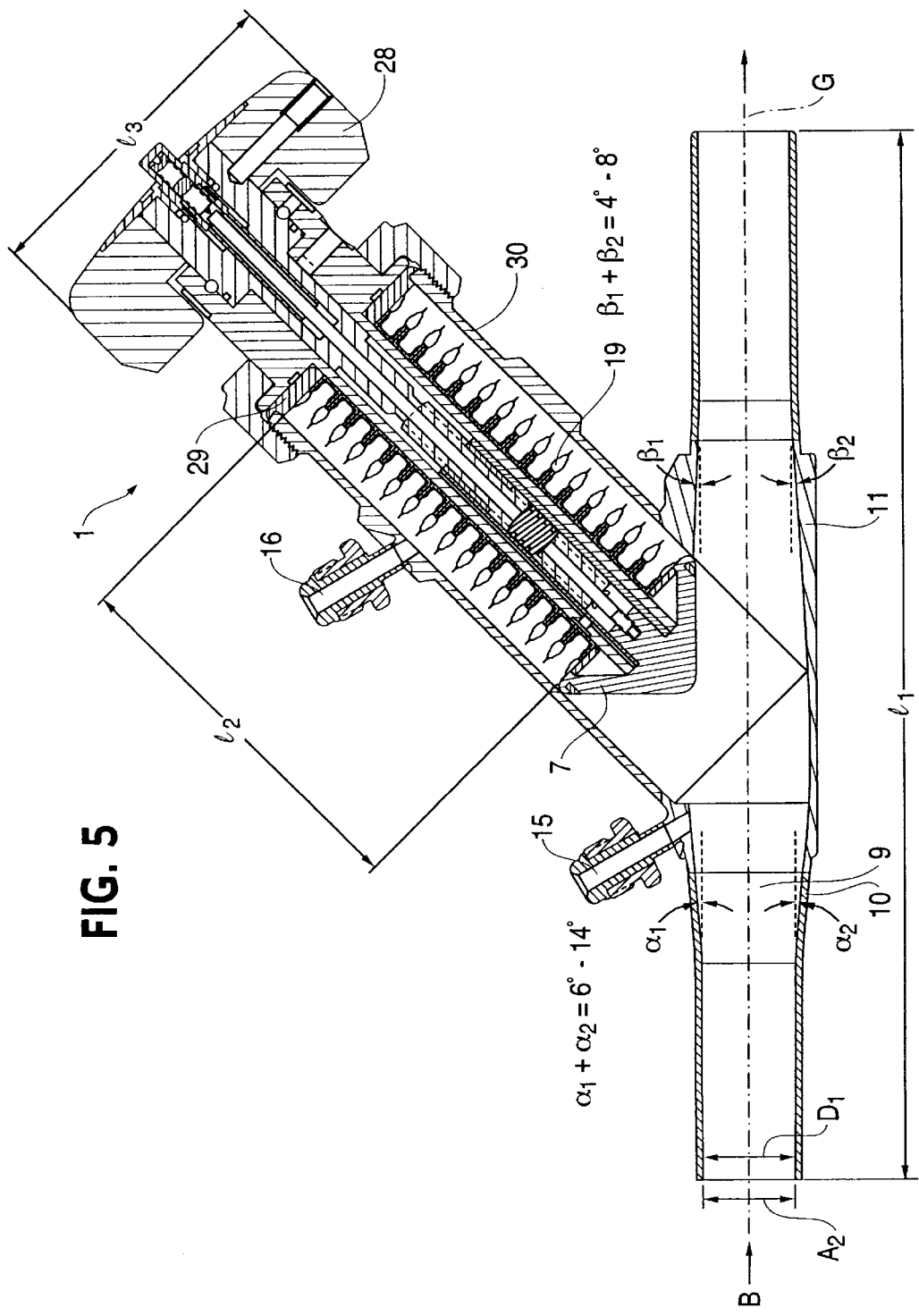
FIG. 5 is a cross-sectional view of the valve of FIG. 1 but showing the poppet withdrawn from the valve seat by the actuator to the open position of the valve.

The poppet 7 is also aerodynamically shaped such that, when the valve is in the open position as shown in FIG. 5, the resistance to flow of fluid through the valve 1 is very nearly the same as that through a straight tubing having a cross-sectional area of the inlet 3 and a length corresponding to the length $l_1$ of the valve 1. The length $l_1$ of the valve 1 in the disclosed embodiment is 10.2 inches. In the illustrated embodiment, the poppet 7 has a conical shape with an included angle of 90°. The valve seat 6 in the disclosed embodiment is arranged in a plane which makes an acute angle θ of 45° to the longitudinal central axis of the fluid passage 5 through the valve body 2, see FIG. 1. The actuator mechanism 8 moves the poppet and the seal 17 thereof in a direction E as shown by the arrow 32 in FIG. 4 orthogonal to the plane 33 of the valve seat, FIG. 4, for opening and closing the valve. The finish of the internal surfaces of the wetted parts of the valve 1 are polished to less than or equal to 10 Ra, the same finish employed in the inside of tubing 24 of the control system 12. In the disclosed embodiment, the inlet 3 and outlet 4 are formed by the ends of cylindrical tubes 18, and 18' having the same diameter and located along the axis of the fluid passage 5 on respective sides of the expansion chamber 9 as seen from the drawings.

The inlet and outlet of tubes 18 and 18' are connected to the tubing 24 of like diameter as shown schematically in FIG. 1. The metal parts of the valve 1 in the disclosed embodiment are formed of a high strength, nickel-base, corrosion resistant alloy, particularly Hastelloy® C22™, but other materials could be used, for example, a stainless steel such as 316L.

The bulk process valves of the invention are for use with the tubing of gas or liquid control systems, one of which is identified by reference numeral 12 in FIG. 1. The size of the tubing of such systems is ¾ in. or larger O.D. up to 6 inches. The O.D. is 1.0 inch in the disclosed embodiment as noted above, 0.870 inch I.D. Flow rates through these systems and the larger valves of the invention used therewith can be up to 86,000 SCFM, and at pressures of up to 250 psi. The valve 1 in the open position has a Cv of 42, which is approximately the same as the Cv for a 10 inch long section of similarly polished straight tubing of the same size as tubing 18 and 18' of valve 1. That is, the Cv of the valve 1 in the open position is not substantially (10% or more) lower than the straight tubing as with conventional bulk process valves as referred to above. Therefore, there is virtually no loss of energy by adding the valve 1 in place of a 10 inch section of straight tubing in the control system and virtually no pressure drop or flow restriction occurs (when the valve is in the open position, FIG. 5).

The mechanism 8 for moving poppet 7 is actuated by turning knob 28 to advance or retract the poppet between the open and closed positions by way of the threaded drive of the mechanism as depicted in the drawings. The diameter $l_3$ of the knob 28 in the disclosed embodiment is 3.25 inches, FIG. 5. The control system 12 and valve 1 of the invention can be used for delivering any process gas or liquid for manufacturing semiconductors. Examples are these process gases include helium, argon, nitrogen, hydrogen chloride, etc. Deionized water is an example of a liquid which can be processed with the valve 1 and system 12.

Figure 6:
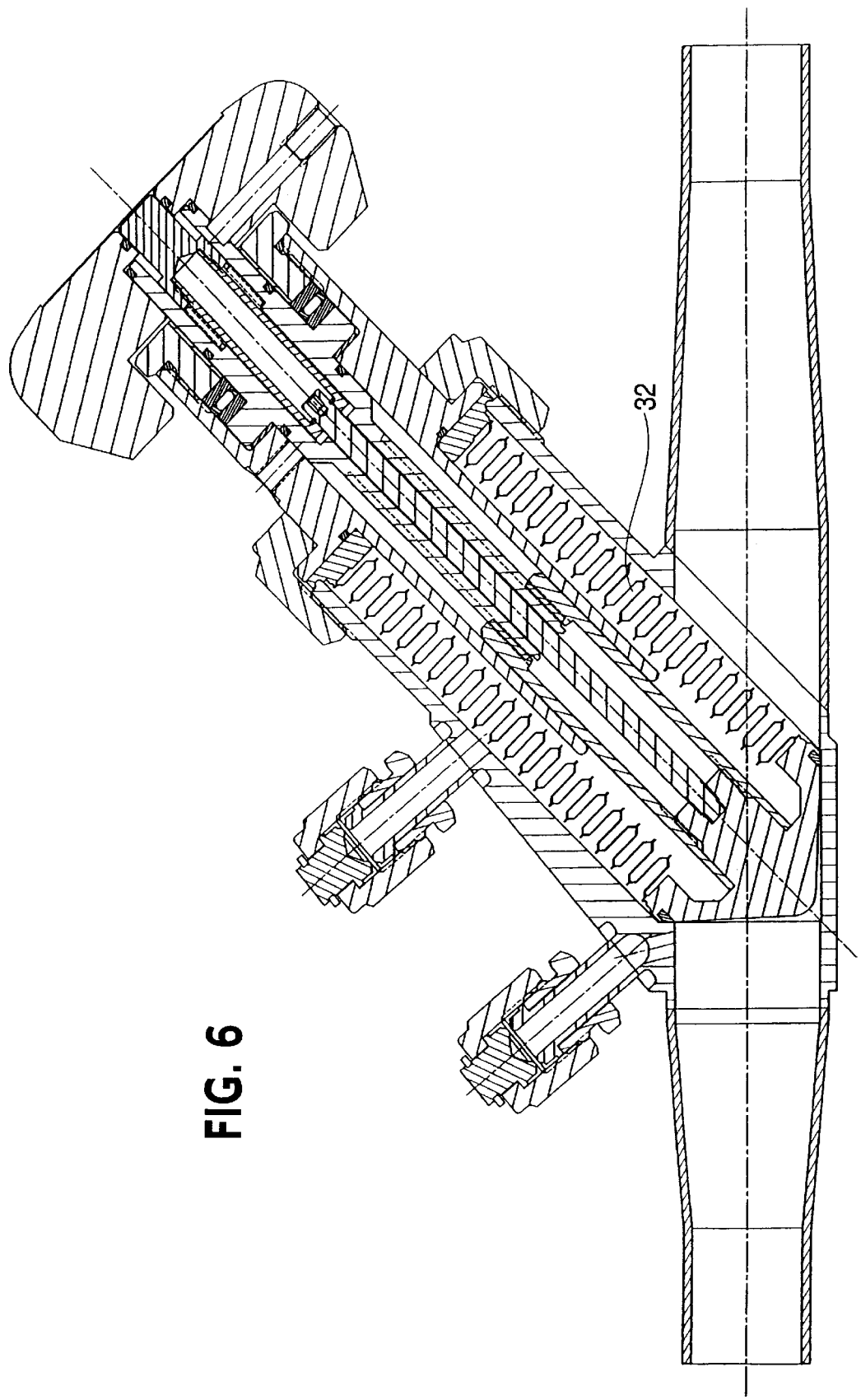
FIG. 6 is a cross-sectional view through another high Cv bulk process valve according to the invention similar to that shown in FIGS. 1–5 but with another form of actuator seal having a welded bellows construction.

An actuator seal 19 about the threaded drive mechanism of actuator mechanism 8 of the valve 1 provides a gas/liquid tight seal between the gas or liquid in the fluid passage 5 of the valve, which is in communication with the exterior of the actuator seal 19 in mechanism 8, and the threaded internal drive of mechanism 8 which is exposed to atmospheric pressure. The actuator seal 19 can be a conventional bellows formed by hydraulically expanding a stainless tube, for example, into a die to form a continuous corrugated bellows which is welded or otherwise sealingly attached at its respective ends to poppet 7 and end plate 29 at opposite end of the tubular housing 30 of the mechanism 8. The actuator seal could also have the new and unique design as disclosed in detail in the aforementioned provisional application filed Jul. 14, 1997, the disclosure of which is hereby incorporated by reference. Purge fittings 15 and 16 are provided on the valve 1 to allow purging of the valve, for example prior to commencing semiconductor processing. The contracted length $l_2$ of the seal 19 is 3.72 inches in the disclosed embodiment, FIG. 5. The actuator seal 32 in FIG. 6 comprises a stack of highly finished, shaped, convoluted diaphragms with their convex sides outward, then welded at their inside meeting and outside metting as depicted in FIG. 6.

The valve 1 and control system 12 according to the invention enable the practice of the improved method of the invention for minimizing the energy consumed by the valve in a gas or liquid control system. More specifically, this method comprises conveying gas or liquid through a fluid passage of the control system, and opening and closing the fluid passage with a valve seat and a moveable poppet arranged in an aerodynamically shaped expansion chamber of a valve provided in a section of the fluid passage of the control system such that when the valve is in the open position, the restriction for flow of the fluid through the valve is very nearly the same as through a straight tubing having a cross-sectional area of the fluid passage upstream of the expansion chamber. As indicated above, the Cv of the valve 1 is 42 which is approximately the same as the Cv for a similarly polished straight tubing of the same size as tubing 18 and 18' of the valve 1 having a length $l_1$ of the valve. Therefore, a valve 1 of the present invention can be added to or subtracted from a gas or liquid control system having like diameter as tubing 18 and 18' in place of a corresponding length of the tubing without changes in pressure drop or flow restriction of the system when the valve is in the open position, i.e., the Cv of the valve 1 is not substantially (10% or more) lower than the Cv of the tubing.

The valve of the invention exhibits a high Cv (very low resistance to flow) through the use of the disclosed combination of features including the expansion chamber having an expanding conical entry extending to the immediate vicinity of the valve seating surface, a slowly contracting conical exit extending from the expansion chamber and a cross-sectional area which is increased along the expanding conical entry to a value 15 to 35% greater than that of the inlet to the expanding conical entry. The entry and exit cones are dimensioned to fit the expanded area using the cone angles and lengths as specified above. The shape of the poppet has also proved important to the success of the invention. As previously noted, in the disclosed embodiment a conical poppet shaped with a 90° included angle has proved best in initial tests. Alternatively, a conical poppet with a curved shape, such as an elliptical shape presented to the gas stream, may be used. In order to compare the Cv of the valve of the invention to that of the tubing or pipe used in an associated control system as discussed above, it is noted that the internal finish of the wetted parts of the valve must be as fine as the finish of the system tubing, generally less than or equal to 10 Ra micro inch.

The improved valve of the present invention is important to the semiconductor industry because it enables a reduction in the amount of pressure required to force process gases and liquids through highly finished tubing control systems. It is meant to replace the multiple, inferior, conventional valves which have much lower, substantially (10% or more) lower Cv characteristics. Advantageously, the valve of the invention can be designed into the tubing of control systems with no pressure drop or flow restriction when the valve is in the open position. It is a "green" valve because it minimizes the energy consumed by valves in semiconductor gas systems.

While we have shown and described only one embodiment in accordance with the present invention, it is understood that the same is not limited thereto, but is susceptible to numerous changes and modifications as known to those skilled in the art. Therefore, we do not wish to be limited to details shown and described herein, but intend to cover all such changes and modifications as are encompassed by the scope of the appended claims.

We claim:

1. A high Cv valve comprising a valve body having an inlet for the flow of fluid to said valve, an outlet for the flow of fluid from said valve, a fluid passage extending through said valve body between said inlet and said outlet, a valve seat provided in said fluid passage, a poppet moveable to and from said valve seat for closing and opening said fluid passage, a mechanism for moving the poppet between a valve closed position where said poppet sealingly contacts said valve seat to close said fluid passage and a valve open position for opening said fluid passage and allowing the flow of fluid through said fluid passage and said valve, and wherein said fluid passage includes an expansion chamber containing said valve seat, said expansion chamber having a cross-sectional area larger than that of said inlet of said valve extending to and from said valve seat and being aerodynamically shaped in the direction of flow through said fluid passage such that, when the valve is in the open position, the Cv of said valve is not substantially lower than the Cv through a straight tubing having a cross-sectional area of said inlet and a length of said fluid passage through said valve.

2. The valve according to claim 1, wherein said aerodynamically shaped expansion chamber includes a conically expanding entry into the immediate vicinity of said valve seat.

3. The valve according to claim 2, wherein a conical entry angle of said conically expanding entry is from six to fourteen degrees, total included angle.

4. The valve according to claim 2, wherein said aerodynamically shaped expansion chamber further includes a conically contracting exit from the immediate vicinity of said valve seat.

5. The valve according to claim 4, wherein the conical exit angle of said conically contracting exit is from four to eight degrees, total included angle.

6. The valve according to claim 4, wherein a conical entry angle of said conically expanding entry is greater than the conical exit angle of said conically contracting exit.

7. The valve according to claim 4, wherein an axial length of each of said conically expanding entry and said conically contracting exit is at least 1.5 times the inside diameter of said inlet of said valve.

8. The valve according to claim 1, wherein the cross-sectional area of said expansion chamber is 15–35% greater than the cross-sectional area of said inlet.

9. The valve according to claim 1, wherein said poppet is aerodynamically shaped.

10. The valve according to claim 9, wherein said poppet has a conical shape.

11. The valve according to claim 10, wherein said conically shaped poppet has a ninety degree included angle.

12. The valve according to claim 1, wherein said valve seat is arranged in a plane which makes an acute angle to a longitudinal axis of said fluid passage.

13. The valve according to claim 12, wherein said acute angle is forty-five plus or minus seven degrees.

14. The valve according to claim 12, wherein said mechanism for moving moves said poppet in a direction orthogonal to said plane of said valve seat for opening and closing said valve.

15. The valve according to claim 1, wherein a finish of internal surfaces of wetted parts of said valve is less than or equal to 10 Ra micro inch.

16. The valve according to claim 1, wherein said inlet and said outlet are formed by cylindrical tubes having the same diameter.

17. The valve according to claim 1, wherein the Cv of said valve is less than 10% lower than the Cv through a straight tubing having a cross-sectional area of said inlet and a length of said fluid passage through said valve.

18. A gas or liquid control system comprising tubing for the flow of gas or liquid therethrough, and a high Cv valve connected to said tubing for controlling the flow of the gas or liquid in said control system, said valve comprising a valve body having an inlet for the flow of gas or liquid to said valve, an outlet for the flow of gas or liquid from said valve, a fluid passage extending through said valve body between said inlet and said outlet, a valve seat provided in said fluid passage, a poppet moveable to and from said valve seat for closing and opening said fluid passage, a mechanism for moving the poppet between a valve closed position where said poppet sealingly contacts said valve seat and a valve open position for allowing the flow of gas or liquid through said fluid passage and said valve, and wherein said fluid passage includes an expansion chamber containing said valve seat, said expansion chamber having a cross-sectional area larger than that of said inlet of said valve extending to and from said valve seat and being aerodynamically shaped in the direction of flow through said fluid passage such that, when the valve is in the open position, the Cv of said valve is not substantially lower than the Cv through a straight tubing having a cross-sectional area of said inlet and a length of said fluid passage.

19. The control system according to claim 18, wherein the diameter of said tubing connected to said high Cv valve is the same or essentially the same as the diameter of said inlet and said outlet of said valve.

20. The control system according to claim 18, including a supply of a gas or liquid for processing semiconductors and a semiconductor processing equipment, said control system extending between said supply and said semiconductor processing equipment for controlling the flow of gas or liquid therethrough.

21. The control system according to claim 18, wherein the Cv of said valve is less than 10% lower than the Cv through a straight tubing having a cross-sectional area of said inlet and a length of said fluid passage through said valve.

22. A method of minimizing the energy consumed by a valve in a gas or liquid control system, comprising conveying gas or liquid through a fluid passage of said control system, and opening and closing said fluid passage with the valve seat and a moveable poppet arranged in a aerodynamically shaped expansion chamber provided in a section of said fluid passage of said control system extending to and from said valve seat in the direction of flow through said fluid passage such that, when the valve is in the open position, the Cv of said valve is not substantially lower than the Cv through a straight tubing having a cross-sectional area of said fluid passage upstream of said expansion chamber and a length of said expansion chamber.

23. The method according to claim 22, wherein the Cv of said valve is less than 10% lower than the Cv through a straight tubing having a cross-sectional area of said fluid passage upstream of said expansion chamber and a length of said expansion chamber.

* * * * *